United States Patent [19]

Richardson et al.

[11] Patent Number: 4,696,377
[45] Date of Patent: Sep. 29, 1987

[54] BRAKE SYSTEM FOR DRAWWORKS

[75] Inventors: Eugene M. Richardson, Pasadena; Norbert O. Brehm, Friendswood; Larry G. Null, Pasadena, all of Tex.

[73] Assignee: LTV Energy Products Company, Dallas, Tex.

[21] Appl. No.: 781,400

[22] Filed: Sep. 27, 1985

[51] Int. Cl.$^4$ .............................................. F16D 65/24
[52] U.S. Cl. .................................. 188/170; 188/70 R; 188/83; 188/151 R; 242/75.41
[58] Field of Search .................. 188/170, 105, 106 R, 188/106 F, 106 P, 71.1, 72.9, 151, 83, 72.4, 70 R, 70 B; 242/75.41

[56] References Cited

U.S. PATENT DOCUMENTS

| | | | |
|---|---|---|---|
| 2,282,615 | 5/1942 | Spalding | 188/151 |
| 2,371,857 | 3/1945 | Stevenson | 188/105 |
| 2,464,469 | 3/1949 | Tremolada | 188/151 |
| 2,502,710 | 4/1950 | Duncan | 254/173 |
| 2,683,020 | 7/1954 | Nickle | 254/173 |
| 2,795,301 | 6/1957 | Driver | 188/189 |
| 2,847,094 | 8/1958 | Abraham | 188/151 R |
| 3,101,828 | 8/1963 | Wilson | 192/139 |
| 3,627,084 | 12/1971 | Benedek | 188/105 |
| 3,964,692 | 6/1976 | Pendleton | 242/54 R |
| 3,986,584 | 10/1977 | Wright et al. | 188/83 X |
| 4,018,140 | 4/1977 | Engle | 188/170 |
| 4,177,973 | 12/1979 | Miller et al. | 254/173 R |
| 4,434,971 | 3/1984 | Cordrey | 254/273 |

Primary Examiner—George E. A. Halvosa
Assistant Examiner—M. C. Graham
Attorney, Agent, or Firm—Arnold, White & Durkee

[57] ABSTRACT

A brake system for a drawworks includes a hydraulically actuated band brake system having a backup spring actuator for emergency stops. The system also includes a caliper disc brake system for emergency stops. The disc brake system includes a rotor directly mounted to the drum barrel and a pair of spring actuated caliper assemblies.

6 Claims, 4 Drawing Figures

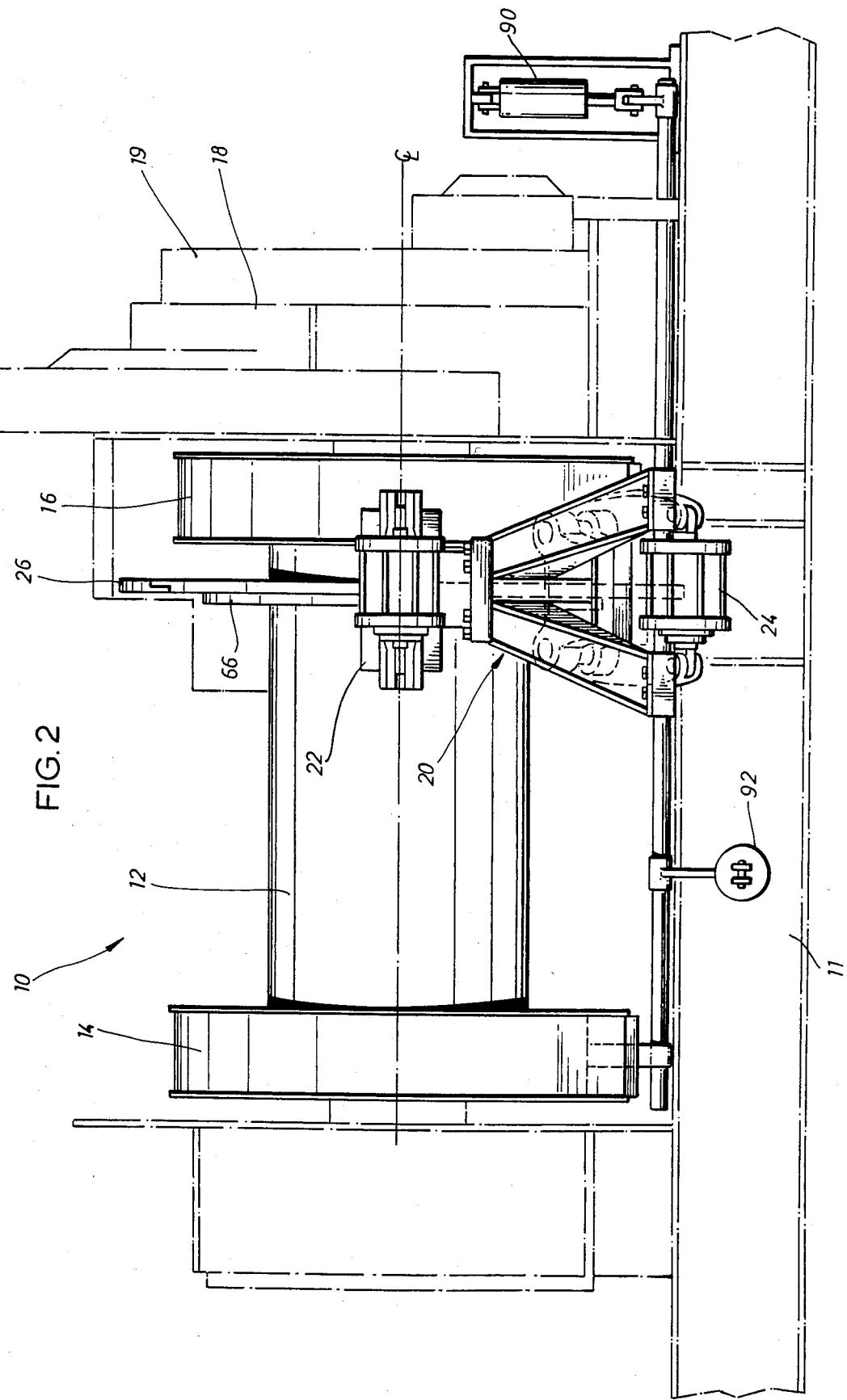

BRAKE SYSTEM FOR DRAWWORKS

BACKGROUND OF THE INVENTION

The present invention relates to brake assemblies for drawworks such as are used with oil drilling rigs and, more particularly, relates to a safety brake system for a drawworks.

Drawworks are conventionally used with an oil drilling rig or derrick to raise or lower pipe stands and drill strings into and out of the well bore. The drill string is generally attached to a hook connected to a traveling block which is secured in block and tackle fashion with a crown block secured to the top of the derrick.

The cable which runs between the traveling and crown block is securely fixed to the ground at one end so as to form a dead line. The other end of the cable is secured to a drum on the drawworks which reels the cable in and plays it out so as to raise and lower the drill string.

The drawworks includes a drive system and clutch for turning the drum and a brake system for controlling the drum as the cable is played out and to stop the drum so as to hold the drill string in a fixed position.

The brakes are ordinarily controlled by a brake lever manually actuated by the driller. Conventional brakes include a brake rim located at each end of the drum and brake bands which encircle the rims.

As drilling requirements such as deeper wells and faster speeds of drilling operations have increased, it has become harder to manually apply the band brakes to handle the greatly increased loads.

Additionally, the requirements which are placed upon the band brakes in emergency situations has also increased. Larger loads have increased the possibility of runaway operations. If a drill string is not properly slowed and stopped as it is lowered, the traveling block can strike the drilling floor and severly damage the equipment and endanger the workers.

Accordingly, there is a need for a brake system which can handle the increased loads and which can provide an emergency braking system of sufficient capacity to stop the rotation of the drum on the drawworks in emergency situations. Such a brake system is disclosed and claimed herein.

SUMMARY OF THE INVENTION

The present invention provides a brake system for a drawworks on a drill rig which is capable of handling the heavy loads carried by large drawworks with significantly less operator effort as compared to manual type brakes. Additionally, the brake system of the present invention provides a redundant brake dedicated to emergency braking only.

The braking system of the present invention includes a hydraulic system for actuating the main band brakes on a standard drawworks such as the Emsco C-3 Drawworks. The hydraulic system includes an actuating lever which allows the driller to "feel" the amount of braking force which he is applying. The force is applied to the brake bands through a hydraulic cylinder and mechanical linkage rather than mechanical linkages alone such as are used on conventional drawworks.

The main band brakes also include a fail safe type, spring applied emergency actuator to apply the brakes under emergency conditions. Such conditions can be caused by a failure in the hydraulic system, when the traveling block is too high or too low, when the rate of descent becomes too fast, or when the driller detects any other type of emergency.

The hydraulic system of the present invention also includes a brake locking system which allows the driller to apply the brakes with the actuating lever and lock them in place without having to maintain manual force on the lever. This locking system also allows the driller to apply additional force through the actuating lever without unlocking the brake should the need arise.

The brake system of the present invention also includes an emergency disc brake. The rotor is mounted directly to the drum barrel of the drawworks to provide secure, rapid, direct stopping of the drum barrel under emergency conditions. Disc brakes previously used on drawworks were located at a position remote from the drum barrel thus requiring the forces to be transmitted through several components in order to stop the drum.

Two spring actuated caliper assemblies are used to grab the rotor and provide the braking force. The caliper assemblies are spring actuated so that they will automatically apply the force in emergency situations. The caliper assemblies are retracted hydraulically. Thus, if there is any interruption in the controls of the brake system, the hydraulic pressure is exhausted and the brakes are automatically applied.

In as much as the disc brake is only used in emergency situations, there is the possibility that the rotor might become corroded during long periods of non-use. This is especially true when the drawworks is being used on an offshore drilling platform where it is subjected to the highly corrosive salt atmosphere.

Accordingly, the caliper assemblies of the present invention are biased in opposite directions such that the brake pads of the assemblies are forced into slight contact with opposite sides of the rotor during normal operation. This provides a light wiping action which prevents corrosion from forming and keeps the emergency brake in prime condition at all times.

Because of the space limitations on the drawworks for the disc brake assembly, the present invention utilizes a modified caliper assembly for clamping the brake pads against the rotor. The brake shoe end of the main lever arms of the caliper assemblies are each provided with a bearing surface for directly engaging the back of the brake shoes. Thus, as the lever arms pivot around the main hinge pins, the force of the lever is applied against the brake shoe through the bearing surface rather than through the secondary hinge pin. Thus, the secondary hinge pin can be much smaller in size which reduces the size of the caliper assembly.

Further features of the invention and advantages thereof will become apparent from the detailed description and claims which follow.

BRIEF DESCRIPTION OF THE DRAWINGS

FIG. 2 is a rear elevational view of a drawworks including the braking system of the present invention, taken along line 2—2 of FIG. 1.

DETAILED DESCRIPTION

Figure 1:
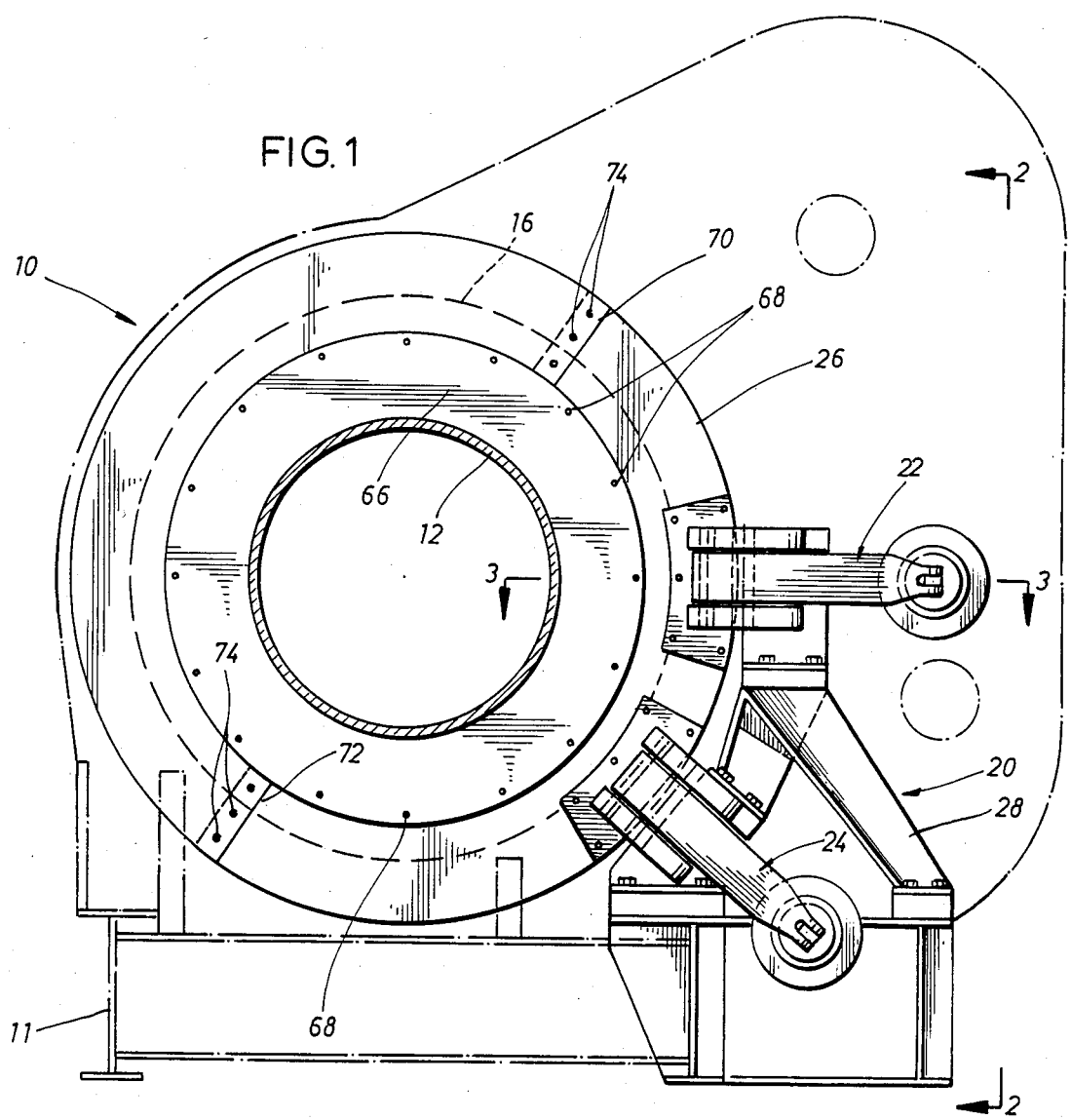
FIG. 1 is a side elevational view of the disc brake assembly of the present invention mounted on a conventional drawworks.

The present invention provides an improved brake assembly suitable for use on drawworks on drilling rigs. More particularly, the invention provides a hydraulicly actuated main brake system and an emergency brake system to control and stop rotation of the drawworks drum barrel. The invention is best understood by reference to the drawings in which like parts are designated with like numbers throughout.

Reference is first made to FIG. 2 which illustrates a conventional drawworks such as the Emsco C-3 Drawworks modified to include the present invention. The drawworks is illustrated with the housing removed to facilitate understanding. The drawworks is generally designated at 10 and includes a supporting frame 11.

A drum barrel 12 is mounted on frame 11 for receiving the cable used to raise and lower a drill string. Brake rims 14 and 16 are mounted on each end of drum barrel 12 and are conventional band brake rims.

Drawworks 10 also includes a drive mechanism 18 and a clutch assembly 19. As more fully described hereinafter, clutch assembly 19 is modified such that it disengages the drive mechanism when the emergency brake is applied.

The drawworks also includes a crown block protector assembly (not shown). This assembly is connected to the drum so as to measure its rotation. The assembly can be adjusted to actuate the brake system on the drawworks when the traveling block reaches a predetermined upper or lower limit. This protects the block assemblies and the rotary table.

An emergency brake assembly 20 is mounted on the rear of drawworks 10. Emergency brake assembly 20 includes first and second caliper assemblies 22 and 24. A rotor 26 is mounted directly to drum barrel 12 and is engaged by caliper assemblies 22 and 24 to provide the emergency braking action.

Reference is next made to FIG. 1 which illustrates in greater detail emergency brake assembly 20. Brake assembly 20 includes a support frame 28 which is mounted on drawworks frame 11. Frame 28 supports caliper assemblies 22 and 24 such that rotor 26 can rotate freely through them during normal operation. When actuated, caliper assemblies 22 and 24 securely grab rotor 26 and stop the rotation of drum barrel 12.

Figure 3:
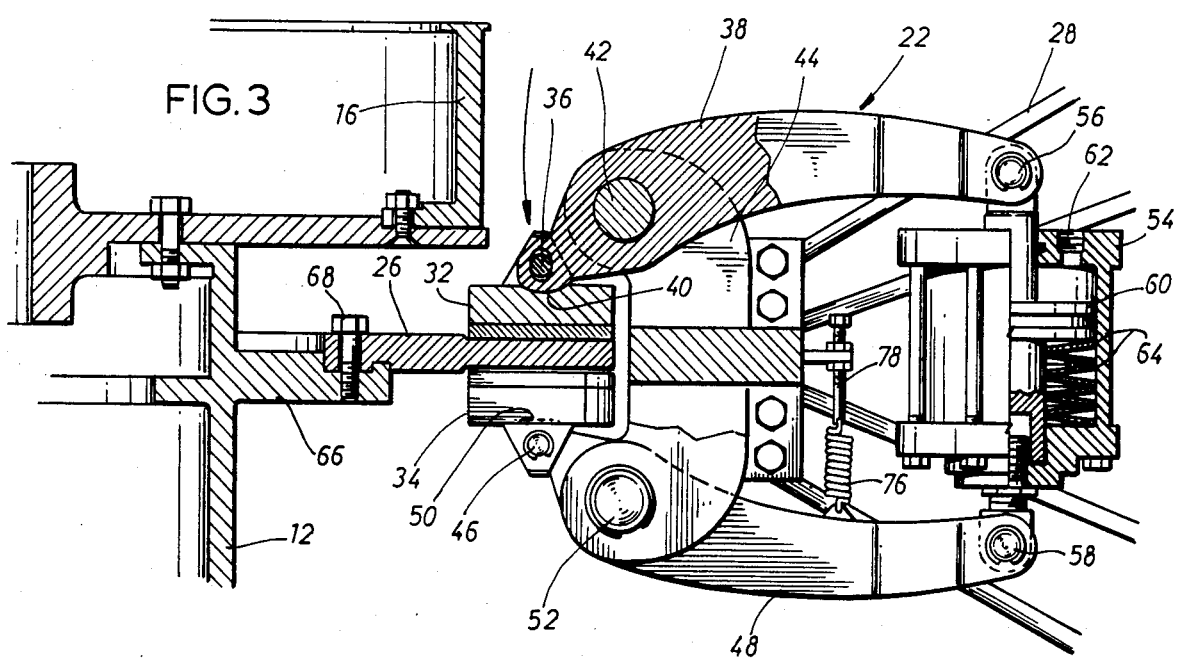
FIG. 3 is a top view of a caliper assembly taken along line 3—3 of FIG. 1.

Reference is now made to FIG. 3 which illustrates in greater detail the construction of caliper assembly 22. Caliper assembly 22 includes brake shoes 32 and 34 which are designed to engage rotor 26. Brake shoe 32 is connected by means of hinge pin 36 to a lever arm 38. Lever arm 38 includes a bearing surface 40 which is designed to engage brake shoe 32 to transmit the force from lever arm 38 to brake shoe 32 to grip rotor 26. Lever arm 38 pivots around a hinge pin 42 which is mounted to frame 28 by bracket 44.

In a similar manner, a lever arm 48 is connected to brake shoe 34 by a hinge pin 46. Lever arm 48 pivots around hinge pin 52 which is also connected to bracket 44. Lever arm 48 includes a bearing surface 50 for engaging brake shoe 34.

Caliper assembly 22 is activated by caliper cylinder assembly 54. Cylinder assembly 54 is connected to lever arms 38 and 48 by hinge pins 56 and 58 respectively.

Caliper cylinder assembly 54 is spring actuated and is retracted by hydraulic pressure. In the embodiment illustrated in FIG. 3, cylinder 54 includes a piston 60 which is retracted by hydraulic pressure entering through port 62. A plurality of disc springs 64 are provided behind piston 60 such that they cause the piston to be extended when the hydraulic pressure is removed. Other types of spring actuating means could also be used.

Accordingly, the force of disc springs 64 in cylinder 54 cause piston 60 to be extended such that cylinder 54 acts through lever arms 38 and 48 to cause brake shoes 32 and 34 to clamp the rotor 26. The rotor is secured to the drawworks drum and as the brake shoes engage, rotation of the drum shaft assembly is retarded and stopped.

Hydraulic pressure provided through port 62 is used to retract the caliper cylinder 54 against the actuating spring force. The retracting action disengages brake shoes 32 and 34 from rotor 26 and permits running clearance. In this condition, the drum shaft assembly is free to rotate.

As can be seen with reference to FIGS. 1 and 3, rotor 26 is attached to a flange 66 on drum barrel 12 by a plurality of bolts 68. Inasmuch as rotor 26 is connected directly to drum barrel 12, the braking action of the caliper assemblies is transferred directly to the drum barrel to stop rotation.

Caliper assembly 24 is essentially identical to caliper assembly 22. Assembly 24 is mounted on frame 28 below assmebly 22.

As can be seen in FIG. 1, rotor 26 is split at 70 and 72 to form two semicircular halves which are secured together by bolts 74. Accordingly, rotor 26 can easily be mounted on or removed from drum barrel 12 should repair or replacement be necessary.

Referring again to FIG. 3, a spring 76 is mounted to lever arm 48 and is connected to bracket 44 of caliper assembly 22 by means of an adjustment screw 78. As spring 76 pulls on lever arm 48 it causes it to rotate about hinge pin 52. This causes caliper cylinder assembly 54 to push against lever arm 38 which rotates about hinge pin 42 causing brake shoe 32 to rub against rotor 26. By adjusting screw 78, the force of spring 76 on lever arm 48 can be adjusted such that brake shoe 32 just barely rubs against rotor 26.

This rubbing action helps prevent corrosion from building up on rotor 26 during periods of non-use. Accordingly, the surface of rotor 26 is always maintained clean such that the braking action will be at maximum effectiveness when needed.

Caliper assembly 24 also includes a biasing spring similar to spring 76, but it is mounted on the opposite side such that caliper assembly 24 wipes against the opposite side of rotor 26. In this manner, both sides of the rotor are maintained clean.

Figure 4:
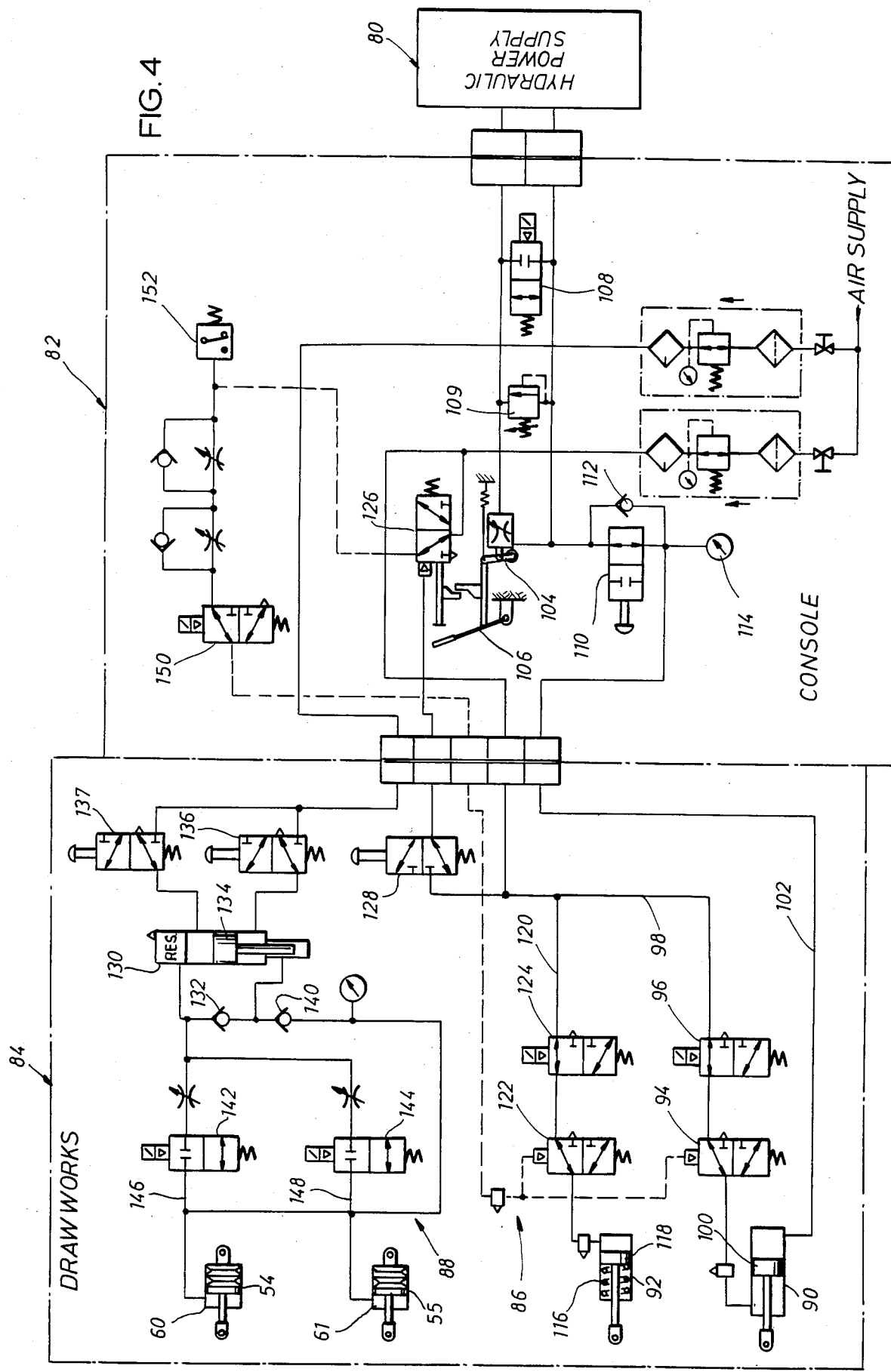
FIG. 4 is a schematic diagram of the hydraulic system of the brake system of the present invention.

Reference is next made to FIG. 4 which schematically illustrates the hydraulic/pneumatic system for the preferred embodiment of the present invention. This system includes three main components: a hydraulic power supply 80; a console unit 82; and the drawworks unit 84.

Hydraulic power is supplied to the brake system by one of two identical and redundant hydraulic power units in hydraulic power supply 80. Each power unit is equipped with a reservoir, pump, motor, filters, heat exchanger and heater. Each unit supplies a continuous flow of hydraulic fluid at the pressure determined by a hydraulic brake valve discussed hereafter. A relief valve at the power unit provides over-pressure protection for the pump. With the exception of the hydraulic brake valve, all of the components of the hydraulic power supply are conventional and well known in the art.

Drawworks unit 84 includes a main band brake circuit 86 and an emergency brake circuit 88. The primary brake for the main drum is a standard, Emsco C-3 drawworks dual band brake equipped with a special hydraulic actuator 90 and an emergency spring actuator 92. This brake is used for stopping the main drum rotation in normal operation. During an emergency stop, delayed application of this brake by the emergency actuator causes it to perform as a backup to the caliper emergency brake.

A brake band assembly is located at each end of the wire line drum. (See FIG. 2.) Each band wraps 324° around brake rims 14 and 16 which are attached to the wire line drum and drum shaft. These bands are self energizing upon application when lowering a load with the drawworks. Braking is equalized between the bands with an automatic equalizer on the dead end of the bands. The live end of the bands are actuated by levers attached to a common brake shaft. This shaft is connected to the brake handle shaft by a mechanical linkage. All of this equipment is conventional on a standard C-3 Drawworks.

In a conventional drawworks, the brake handle is attached to the brake handle shaft and operated by the driller to apply the main brake. However, with the brake system of the present invention, the brake handle is removed and replaced with hydraulic actuator 90.

Actuator 90 is hydraulically extended and air retracted. Two three-way valves 94 and 96 are located in air line 98 between actuator 90 and console unit 82. Valve 94 is operated by air and valve 96 is solenoid operated. For normal operation, valve 94 is pressurized and solenoid valve 96 is energized to allow a continuous air supply to flow through line 98 to actuator 90. This air pressure is applied to the rod side of piston 100 to keep the cylinder retracted and the brake disengaged when not in use.

During an emergency stop, the solenoid is de-energized and pilot pressure to valve 94 is released. This causes the valves to shift, block the air supply, and exhaust air from actuator 90. This removes the disengaging force and the actuator 90 applies the main drum band brake. Valves 94 and 96 are redundant and shifting of either valve will cause the air to exhaust. Similarly, when valves 122 and 124 are shifted, air is exhausted from actuator 92, and spring 116 causes piston 118 to retract, thus assisting in the application of the main drum band brake.

Hydraulic pressure is applied to piston 100 in actuator 90 through line 102 to extend the actuator which moves the brake linkage to apply the band brakes. The linkage provides a mechanical advantage such that the input force of actuator 90 is multiplied when applied to the live ends of the brake bands.

The force applied by actuator 90 is controlled by the driller through the main brake control with a special hydraulic brake valve 104 located in console unit 82. Valve 104 produces increased pressure over its operating range and allows the driller to "feel" the magnitude of the brake force he is applying. A suitable valve is a modified AUSCO power brake valve. The force required to maintain the brake control handle 106 at a certain position is proportional to the hydraulic pressure being produced by the valve. This force input by the driller is multiplied mechanically and hydraulically to the live ends of the brake bands as previously described.

The main brake hydraulic system piping in console unit 82 includes a solenoid operated two-way valve 108. For normal operation, valve 108 is energized and closed to prevent flow through the valve, thus forcing the hydraulic fluid to flow through the hydraulic brake valve 104. During an emergency stop, the solenoid is de-energized and the valve 108 shifts to the open position and allows fluid to flow through it, thus bypassing hydraulic brake valve 104. This prevents the driller from applying the main drum band brake once an emergency stop is initiated. A main brake relief valve 109 is provided to protect the system from excess pressure.

The main brake controls of the console also include a brake lock valve 110. The driller may engage the band brake and lock it in the applied position by shifting brake lock valve 110 to the "on" position. The brake handle can then be released and will automatically return to its stored position and hydraulic pressure will be maintained in line 102 and hydraulic actuator 90.

Should additional brake capacity be required while the brake lock valve 110 is "on", the brake control handle 106 can be rotated down until the hydraulic pressure increases to the desired amount. This increased pressure bypasses valve 110 and passes through check valve 112 to increase the pressure on actuator 90. The new increased hydraulic pressure will be maintained on hydraulic actuator 90 when brake control handle 106 is released. No operation of brake lock valve 110 is required. To release the main drum band brake from the applied position, brake lock valve 110 is shifted to the "off" position.

A hydraulic pressure gauge 114 is provided in console unit 82 to allow the driller to monitor the hydraulic pressure being applied to actuator 90 through line 102. This gauge also indicates the amount of force being applied to the main brake when the lock valve 110 is on.

The main drum band brake emergency actuator 92 is used to apply the main brake during an "emergency stop." Actuator 92 is air extended, spring retracted and is connected to an actuating lever mechanism on the main drum band brake shaft. The lever rotates the shaft and engages stops fixed to the shaft. The spring 116 causes piston 118 to retract, rotate the brake shaft, and apply the band brake. When air is applied to actuator 92 through line 120, it extends piston 118 and the lever rotates away from the lugs on the shaft. This releases the brake and allows it to operate normally, being applied and released with the hydraulic actuator 90.

Two three-way valves 122 and 124 are located in air line 120 between the console unit 82 and actuator 92. Valve 122 is pilot operated by air and valve 124 is solenoid operated. For normal operation, pilot operated valve 122 is pressurized and solenoid valve 124 is energized to allow supply air to flow through the line to actuator 92. This causes it to extend and release the brake. During an emergency stop, the solenoid is de-energized and pilot pressure is released. This action shifts the three-way valves to block the supply air and to exhaust the air within the cylinder, thus applying the brake. These valves are redundant and the shifting of either valve will cause the brake to apply.

An "emergency stop", can be initiated by the driller using the main brake controls in two ways. First, if there is insufficient hydraulic pressure when the driller tries to apply the main brake, the brake control handle 106 will over travel its normal operating range and trip emergency stop valve 126. Second, if the driller determines that an emergency stop is necessary, he can manually activate emergency stop valve 126. Valve 126 exhausts pilot pressure on valves 94 and 122 and pressure switch 152. When pressure switch 152 opens, electrical power is removed from all solenoid valves.

Tripping of emergency stop valve 126 results in an emergency stop of the main drum rotation. An "emergency stop" consists of applying the caliper emergency brake, followed by a delayed application of the main drum band brake by emergency actuator 92. The emergency stop valve 126, its trigger mechanism, valve 94, valve 122, pressure switch 152 and emergency actuator 92 are reset using valve 128 located in the drawworks unit.

The caliper emergency brake system in the preferred embodiment of the present invention consists of two caliper mechanism assemblies 22 and 24 and a rotor 26 as illustrated in FIGS. 1 to 3. The caliper assemblies include brake shoes, lever arms and spring actuated cylinders which actuate the caliper brake. Spring force from the cylinders acting through the lever arms causes the brake shoes to clamp the rotor. The rotor is secured to the drawworks drum and, as the brake shoes engage, rotation of the drum shaft assembly is retarded and stopped.

The hydraulic circuitry and controls of caliper assemblies 22 and 24 is further illustrated with reference to FIG. 4. A booster 130 is provided in drawworks unit 84 to act as a pressure intensifier unit which converts drilling rig air pressure to higher hydraulic pressure. Booster 130 also includes a hydraulic fluid reservoir.

Hydraulic pressure provided by booster 130 is used to retract caliper cylinder assemblies 54 and 55 against the actuating spring force. Caliper cylinder assemblies 54 and 55 contain internal pistons 60 and 61 for this purpose. The retracting action disengages the brake shoes from the rotor and permits running clearance. In this condition, the drum shaft assembly is free to rotate.

Valves on booster 130 are utilized to control retracting pressure. Hydraulic fluid is drawn from the booster reservoir through check valve 132 into the high pressure section of booster 130 when the booster piston 134 is retracted. The piston is retracted when valve 136 is shifted and air pressure is applied to the ram side of the piston 134. When valve 137 is shifted, air pressure is applied to the head side of the piston and the hydraulic fluid is forced under pressure through check valve 140 into caliper cylinder assemblies 54 and 55. Check valve 132 prevents the fluid from flowing back to the booster reservoir.

The above procedure is used to reset actuators 54 and 55 after an emergency stop.

Solenoid valves 142 and 144 are placed in the hydraulic lines 146 and 148, leading to caliper cylinder assemblies 54 and 55. When valves 142 and 144 are de-energized they relieve pressure from caliper cylinder assemblies 54 and 55 such that the springs therein cause the emergency brake to be applied. When energized, they allow pressure to be applied to caliper cylinder assemblies 54 and 55 to release the calipers.

The drum clutches on the drawworks (FIG. 2) include relay valves (not shown) which are solenoid operated three-way valves. One valve is mounted in the air supply line of the low drum clutch and one valve is in the air supply line of the high drum clutch. When de-energized, these valves exhaust air from the clutches and block supply air at the valve. When energized, these valves allow air to flow to and from the clutches through the valve allowing the clutches to be operated by the control valve at the driller's console.

An emergency stop is initiated by de-energizing the solenoid valves in the main drum brake and caliper emergency brake assemblies. These valves include valves 142 and 144, 124, 96 in the drawworks unit, the solenoid valves attached to the drum clutches, and valves 108 and 150 in the console unit. These valves must all be energized to allow the drawworks to operate under normal conditions. Electrical power is supplied to all the solenoid valves from the same circuit. Two components are mounted in series in the circuit to switch the circuit open and de-energize the solenoid valves. Either or both components will, when opened, cause an emergency stop.

One component is a pressure switch 152 which opens its electrical contacts when the emergency stop valve 126 is tripped and air pressure is exhausted from the pressure switch. The other component is a pair of electrical relays which are wired in parallel and which switch open when the electrical signal is shut off from any other source such as a crown block protector. Two parallel relays are provided so that failure of one relay will not initiate an unexpected emergency stop. A loss of electrical power to the circuit will also result in de-energizing the solenoid valves and an emergency stop.

When an emergency stop is initiated by one of the above actions, the following essentially simultaneous events occur due to the solenoid valves being de-energized.

First, two-way wave solenoid bypass valve 108 is opened to relieve any hydraulic pressure from hydraulic actuator 90 on the band brakes. This removes the driller's control of the main drum band brake. The solenoid relay valves on the high and low drum clutches will shift to block the air supply to the clutches and exhaust the air in the clutches. This removes hoisting power from the drum shaft.

Second, solenoid relay valve 96 shifts to relieve the 80 psi air from the rod side of the hydraulic actuator 90. This removes the air pressure acting to disengage the main drum band brake.

Third, solenoid valves 142 and 144 shift to relieve pressure from the caliper cylinder assemblies 54 and 55 such that the caliper emergency brake is applied. Application of the brake will occur in about 0.4 seconds or less. This braking rapidly retards and stops main drum rotation.

Finally, solenoid relay valve 124 is shifted to relieve air pressure from the emergency actuator cylinder 92 which applies the main band brake independent of the hydraulic actuator 90. The application of the main drum band brake occurs after the caliper emergency brake has engaged. This provides additional redundant braking to the main drum during an emergency stop for additional safety.

While the preferred embodiment of the present invention has been described only with respect to a main drum barrel, the system can also be applied to drawworks which include a sandreel drum. The sandreel would include a band brake for controlling its rotation. The emergency brake system on a drawworks including a sandreel would have a brake system essentially identical to the main band brake system on the main drum barrel. Accordingly, it would utilize a hydraulic actuator and a spring actuated emergency actuator. The hydraulics and other controls for the sandreel brake would be similar to those of the main brake.

As can be seen from the foregoing, the present invention provides an emergency brake system for a drawworks on a drilling rig which can provide prompt, secure stopping of the rotation of the drum barrel. The system is advantageous in that it is hydraulically actuated to provide flexibility in operation. With hydraulic controls, the operator can have the control console mounted in any of a number of positions rather than immediately adjacent the drawworks as required when a manual lever is used to apply the brakes. Additionally, the hydraulic system can be used to apply greater forces with less effort on the part of the driller. Finally, the hydraulic system of the present invention utilizes a hydraulic brake valve which provides a "feel" of the application of the brakes. Thus, the driller can sense the amount of braking force which is being applied.

The present invention also provide an emergency braking system which completely and quickly stops rotation of the drum barrel in the case of an emergency. This system can be actuated by the driller or by any of a number of automatic systems. For example, the emergency braking system can be actuated if the traveling block is raised too high or lowered too low. Additionally, if hydraulic pressure or electrical power is interrupted, the brake system is applied to prevent damage from occurring to the drilling unit.

While the invention has been described with respect to the presently preferred embodiment, it will be appreciated that the invention may be embodied in other specific forms without departing from the spirit or essential characteristics thereof. The described embodiments are to be considered in all respects only as illustrative and not restrictive and the scope of the invention is, therefore, indicated by the appended claims rather than by the foregoing description. All changes or modifications which come within the meaning and range of equivalency of the claims are to be embraced within their scope.

What is claimed is:

1. A safety brake mechanism for a drawworks comprising:
    a caliper disc brake system comprising:
        a rotor mounted on a drum barrel on said drawworks;
        a first spring actuated caliper assembly mounted on said drawworks such that it can engage said rotor to stop rotation of said drum barrel, said first assembly being biased such that it lightly engages a first side of said rotor during normal operation;
        a second spring actuated caliper assembly mounted on said drawworks such that it can engage said rotor to stop rotation of said drum barrel, said second assembly being biased such that it lightly engages a second side of said rotor during normal operation;
        means for activating said first and second caliper assemblies; and
    a hydraulically actuated band brake assembly for controlling rotation of said drum barrel during normal operation and under emergency conditions, said band brake assembly including an emergency actuator for engaging said band brake.

2. A safety brake mechanism for a drawworks as defined in claim 1 wherein said activating means comprises a spring actuated cylinder attached to each caliper assembly.

3. A safety brake mechanism for a drawworks as defined in claim 1 wherein said spring actuated cylinders are attached to a pair of lever arms on each caliper assembly, each lever arm having a bearing surface for engaging a back of a brake shoe.

4. A safety brake mechanism for a drawworks as defined in claim 1 wherein said band brake assembly further comprises a brake lock valve for maintaining said brake in an engaged position.

5. A safety brake mechanism for a drawworks as defined in claim 4 wherein said brake lock valve includes means for increasing the force applied to said band brake assembly without releasing said lock valve.

6. A safety brake mechanism for a drawworks as defined in claim 1 wherein said emergency actuator for engaging said band brake is spring actuated.

* * * * *